E. I. ENGQVIST
DEVICE FOR METERING OF COMMUNICATIONS
BY MANUAL TELEPHONE SYSTEM
Filed Nov. 29, 1945
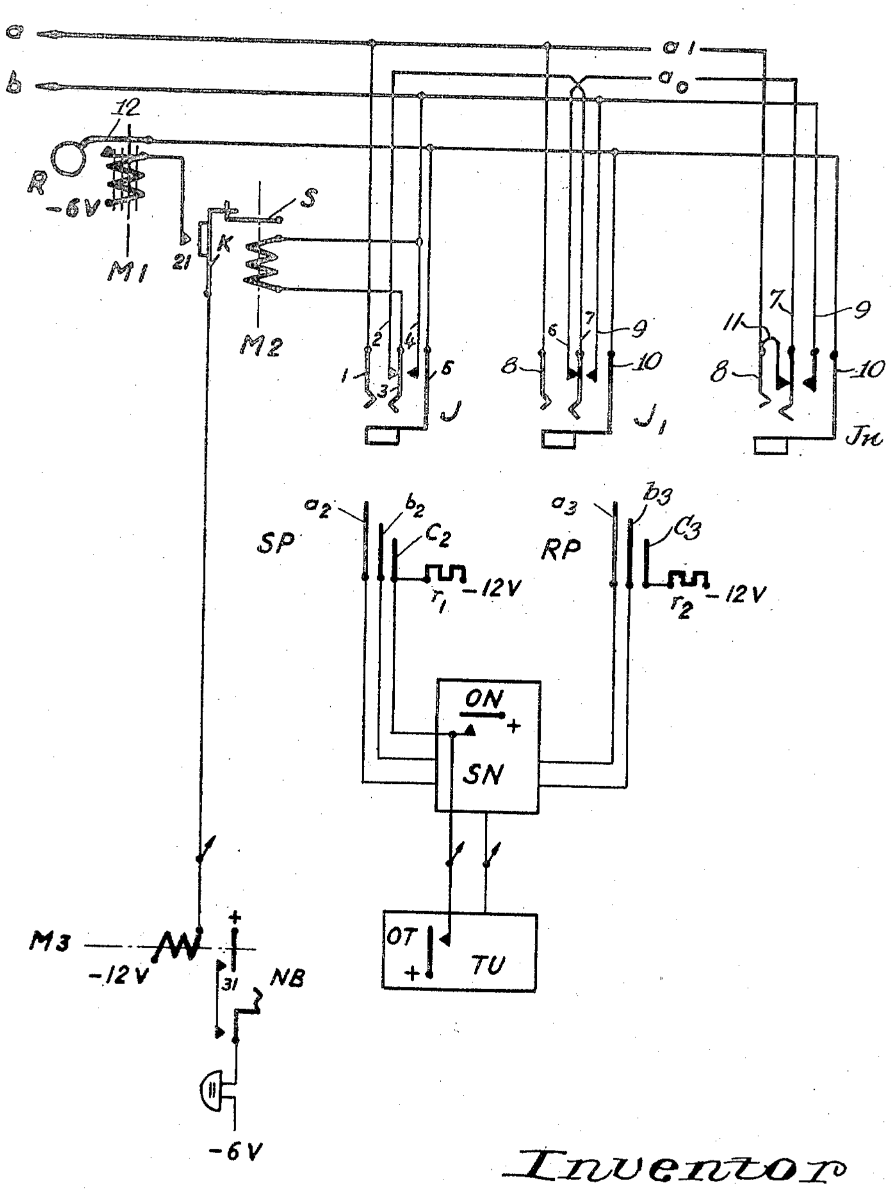
Inventor
E. I. Engqvist
By Glascock Downing & Seebold
Attys.

Patented Aug. 8, 1950

2,517,643

UNITED STATES PATENT OFFICE 2,517,643

DEVICE FOR METERING OF COMMUNICATIONS BY MANUAL TELEPHONE SYSTEM

Erik Isidor Engqvist, Stockholm, Sweden, assignor to Telefonaktiebolaget L M Ericsson, Stockholm, Sweden, a company of Sweden Application November 29, 1945, Serial No. 631,673
In Sweden February 12, 1945

4 Claims. (Cl. 179—9)

This invention relates to a circuit arrangement for metering calls in a telephone system of the type wherein the calling current is provided by a magneto.

In the usual telephone system of the type used in rural areas, these being for the most part battery operated systems, the answering jacks, or the cut-off relays connected therewith, are often provided with an extra contact, which is closed when the plug is inserted into the jack, and thereby closes a circuit through the winding on the message register to the sleeve of the answering jack. The message register can then be operated by current impulse sent over the sleeve conductor of the answering plug and is thereafter held in circuit over this conductor throughout the following communications. This well known arrangement involves the disadvantage that a considerable electrical energy consumption is necessary to hold the message register operated during the period of the communication which increases operating costs in local systems, when the current used is provided by dry batteries.

The present invention has for an object to eliminate the above described high current consumption by the message register.

It is another object of the present invention to provide a circuit arrangement wherein the message register will be operated jointly by the incoming calling current from the calling and the outgoing ringing current to the called subscriber.

In the system for carrying out the above invention the annunciator for each subscriber's line is provided with a contact, which contact is closed when the annunciator drops and completes a circuit for the message register of the subscriber's line, which message register then attracts its armature. The core of the message register is made of a material of high residual magnetism and will hold the armature attracted after the annunciator has been lifted and the local circuit of the message register broken. Then by sending ringing current to the called subscriber a restoring circuit is completed for de-magnetizing the message register after which a metering takes place.

The system for carrying out the invention may be arranged in several different ways, different circuits for de-magnetizing the message register then being used.

The single figure of the drawing shows an embodiment of the invention for a local battery operated system employing indicator jacks.

In the system according to the drawing, $a$ and $b$ are the line wires for the subscriber's line. The calling current is assumed to be generated by a hand operated magneto at the subscriber's station. The call is indicated in the exchange by an annunciator which is of the type device shown by U. S. Patent No. 245,931 to Beach, granted August 31, 1881. The annunciator has a pivoted call indicator K which is normally held in the raised position by a detent S. The circuit of the winding $M_2$ is from the line wire $b$, through the winding of the electro-magnet M—1, normally closed contacts 2—3 of the answering jack J, pairs of normally closed contacts 6—7 of the first calling jack $J_1$, contact 7, bridging piece 11, and contact spring 8 of the final calling jack, to the other side of the line $a$. The calling current from the calling subscriber energizes the winding of the electro-magnet $M_2$ and causes same to attract the detent S, to release the indicator K, which then closes on the contact 21. The dropping of the indicator K indicates the call on a manually operated board.

When the indicator K closes on the contact 21 a circuit is completed for the electro-magnet $M_1$ of the message register R corresponding to the calling subscriber's line. The exchange battery is a 12 volt dry battery with a central tap of −6 volts. The positive terminal of the battery is marked +. The local circuit of the message register R is completed in response to the incoming calling current, this circuit being from −6 volts of the exchange battery, winding on electro-magnet $M_1$, contact 21, winding on relay $M_3$, which has a winding of low resistance and is common to several subscriber's lines, to −12 volts. The message register R attracts the armature and the contact 12 is closed. At the same time the relay $M_3$ attracts its armature and the contact 31 is closed. If the right button NB is depressed, a bell will ring. The operator answers the call by introducing the answering plug SP into the answering jack J, the conductors $a_2$, $b_2$ and $c_2$ of the plug then making contact with the springs 1 and 3 and sleeve 5, respectively, of the jack.

The wire $b$ of the subscriber's line is connected in parallel with the spring 4 in the answering jack J and with the corresponding springs in a number of multiple calling jacks $J_1$—$J_n$, of which only the initial and terminal jacks are shown on the drawing. The wire $b$ is also connected in parallel with the winding $M_2$ of the annunciator. As previously stated, the circuit for this winding is through the normally closed contacts 2—3 of answering jack, 6—7 of the initial and all subsequent, except for the final answering jack, and spring 7, bridging piece 11, and spring 8 of the final calling jack.

When the answering plug SP is inserted into the answering jack J, the contact spring 3 is depressed so that it is separated from contact spring 2 and closes on contact spring 4. The winding $M_2$ of the annunciator is thereby short circuited and the conductors $a_2$ and $b_2$ of the answering plug SP are connected with the subscriber's line. At the same time the call indicator K is manually restored and locked by the detent S. Contact 21 is thereby opened and relay $M_3$ releases its armature, but the winding $M_1$ of the message register R holds its armature attracted due to the high residual magnetism of the core. The core within this winding is preferably made of some material having a high residual magnetism such as hard steel.

If no communication takes place due to the subscriber to whom the call is directed being busy, the operator drops the answering plug SP. If the called subscriber is free however the calling plug RP is introduced into the multiple jack $J_1$—$J_n$ of the called line and a calling signal is sent. For sending the calling signal either the calling key ON for the pair of cords SN, or a calling key OT in the operator's set TU, may be operated. In either case a circuit is made through the conductor $C_2$ in the answering plug SP for operating the message register R. This circuit includes the positive pole of the exchange battery, either the calling key ON or the calling key OT, conductor $C_2$, sleeve 5 of the answering jack, contact 12 of the message register R, winding $M_1$ of the message register to −6 volts. The current through the winding $M_1$ will in this case be in the opposite direction to that which flows in the local circuit of the annunciator $M_1$ when the call indicator K of the latter is released. The magnetic field set up by the current in the circuit closed by either of the calling keys, ON or OT, will set up a magnetic field in the core of the message register which will overcome the residual magnetic field of the latter and thereby effect the release of the armature and the opening of the contact 12. The circuit through the winding $M_1$ is also broken at the contact 12, having been previously broken at the contact 21 through manual restoration of the call indicator K in the annunciator. At the same time the connected indicating mechanism (not shown) of the message register R is moved one step.

If no communication takes place, as stated above, the armature of the message register 12 will remain attracted and the contact 12 closed. When testing the line, the tip of the calling plug RP, that is the conductor $a_3$, is contacted against the sleeve of the selected calling jack $J_1$—$J_n$. In order to prevent busy signals on the subscriber's line when it is free, the testing circuit in the operator's set is connected to −6 volts as well as the winding $M_1$ of the message register R. If on the other hand, the calling plug RP is in one of the calling jacks, such as $J_1$, −12 volts is connected over the resistance $r_2$ in the jack $J_1$, busy signals then being heard on testing. The answering plug SP provides in like manner busy designation with −12 volts over resistance $r_1$. Upon a call to a subscriber's line the message register is not operated, no metering taking place before the ringing current is sent out to the called subscriber.

Having now described my invention which I claim as new and useful and desire to secure by Letters Patent is:

1. In a telephone exchange, a subscriber's line, an answering jack having a pair of normally closed contacts one of which is connected to one side of the line and a pair of normally open contacts, a calling jack connected across the line, answering and calling plugs for said jacks, respectively, the answering plug allowing the normally closed contacts to open and closing the normally open contacts upon insertion into the answering jack, an annunciator including a call indicator and a contact closed thereby and having its winding connected to the other normally closed contact and to the other side of the line so as to be energized by the incoming calling current, and shunted across the normally open contacts of the answering jack so as to be short circuited by the closure of the latter upon insertion of the answering plug into the answering jack, a load circuit including the call indicator and contact of said annunciator, and a message register in said load circuit responsive to closure of the load circuit by the contact of the call indicator.

2. In a telephone exchange, a subscriber's line, an answering jack having a pair of normally closed contacts connected across the line and a pair of normally open contacts, a calling jack connected across the line, answering and calling plugs for said jacks, respectively, an annunciator including a call indicator and a contact closed thereby and having its winding in series with the normally closed contacts and shunted across the normally open contacts of the answering jack so as to be short circuited by the closure of the latter upon insertion of the answering plug into the answering jack, a load circuit for said annunciator including the call indicator and the contact closed thereby and a message register having a winding with a core of high residual magnetism in said load circuit whereby said message register is energized in response to closure of the load circuit by the contact of the call indicator and remains prepared for operation after the annunciator has been re-closed.

3. In a telephone exchange, a subscriber's line, an answering jack having a pair of normally closed contacts and a pair of normally open contacts, a calling jack having a pair of normally closed contacts, answering and calling plugs for said jacks, respectively, an annunciator including a call indicator and a contact closed thereby and having its winding shunted across the normally open contacts in said answering jack so as to be short circuited by the closure of the latter upon insertion of the answering plug in the answering jack, a holding circuit for said annunciator across said line and including the winding of the annunciator and pairs of normally closed contacts of the answering and calling jacks, a load circuit for said annunciator including the call indicator and the contact closed thereby, and a message register in said load circuit responsive to closure of the load circuit by the contact of the call indicator.

4. In a telephone exchange, a subscriber's line, an answering jack having a pair of normally closed contacts and a pair of normally open contacts, a calling jack having a pair of normally closed contacts, answering and calling plugs for said jacks, respectively, an operator's head set with an associated calling key and battery connected to said calling plug, an annunciator including a call indicator and having its winding shunted across the normally open contacts in said answering jack so as to be short circuited by the latter upon insertion of the answering plug in the answering jack, a holding circuit for said annunciator across the line and including the winding of the annunciator and pairs of normally closed contacts of the answering and calling jacks, a load circuit for said annunciator including the call indicator and contact closed thereby, a message register having a winding, an armature, and a core of high residual magnetism with the winding in the load circuit of the annunciator, a contact connected to said winding and closed by the armature when pulled into operated position by completion of the load circuit through closure of the contact by the call indicator of said annunciator in response to ringing current over the line, a restoring circuit for releasing said armature when ringing a called subscriber by conducting a current through the winding of the message register in such direction as to set up a magnetic field in opposition to the residual field of the core, said restoring circuit comprising the winding of the message register, the contact connected thereto, the armature, a conductor to the sleeve of the calling jack, and a conductor from the sleeve of the answering plug to the calling key in the operator's head set.

ERIK ISIDOR ENGQVIST.

REFERENCES CITED

The following references are of record in the file of this patent:

UNITED STATES PATENTS

| Number | Name | Date |
|---|---|---|
| 329,646 | Hibbard | Nov. 3, 1885 |
| 655,164 | Scribner | July 31, 1900 |
| 2,346,910 | Deakin | Apr. 18, 1944 |